United States Patent
Poikselkä et al.

(10) Patent No.: US 8,103,243 B2
(45) Date of Patent: Jan. 24, 2012

(54) SYSTEM AND METHOD FOR HANDLING SESSIONS OF SPECIFIC TYPE IN COMMUNICATION NETWORKS

(75) Inventors: Miikka Poikselkä, Espoo (FI); Petteri Ylä-Outinen, Ojakkala (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 12/584,798

(22) Filed: Oct. 19, 2009

(65) Prior Publication Data

US 2010/0056101 A1 Mar. 4, 2010

Related U.S. Application Data

(63) Continuation of application No. 10/513,510, filed as application No. PCT/IB02/01519 on May 6, 2002, now Pat. No. 7,606,556.

(51) Int. Cl.
*H04M 11/04* (2006.01)
(52) U.S. Cl. .................. 455/404.2; 455/404.1; 455/567; 455/401; 455/421; 455/432.1; 455/436; 455/456.3
(58) Field of Classification Search ............... 455/404.1, 455/567, 401, 421, 404.2, 432.1, 435.1, 436, 455/456.3
See application file for complete search history.

(56) References Cited

U.S. PATENT DOCUMENTS

| | | | | |
|---|---|---|---|---|
| 5,719,929 A * | 2/1998 | Menard | .................. | 379/216.01 |
| 6,073,005 A * | 6/2000 | Raith et al. | .................. | 455/404.1 |
| 6,073,013 A * | 6/2000 | Agre et al. | .................. | 455/428 |
| 6,115,598 A * | 9/2000 | Yu | .................. | 455/404.1 |
| 6,574,484 B1 * | 6/2003 | Carley | .................. | 455/521 |
| 6,680,935 B1 * | 1/2004 | Kung et al. | .................. | 370/352 |
| 7,113,764 B1 * | 9/2006 | Jang et al. | .................. | 455/404.1 |
| 7,120,469 B1 * | 10/2006 | Urakawa | .................. | 455/564 |
| 2002/0005804 A1 | 1/2002 | Suprunov | .................. | 342/457 |
| 2003/0027569 A1 * | 2/2003 | Ejzak | .................. | 455/432 |
| 2003/0027595 A1 | 2/2003 | Ejzak | .................. | 455/560 |
| 2004/0121755 A1 | 6/2004 | Hurtta | .................. | 455/404.1 |
| 2004/0137873 A1 | 7/2004 | Kauppinen et al. | .................. | 455/404.1 |
| 2005/0043008 A1 | 2/2005 | Hurtta | .................. | 455/404.1 |
| 2005/0050194 A1 | 3/2005 | Honeisen et al. | .................. | 709/224 |

FOREIGN PATENT DOCUMENTS

| | | |
|---|---|---|
| EP | 1 073 298 A2 | 1/2001 |
| EP | 1189470 A2 | 3/2002 |
| GB | 2 227 143 | 7/1990 |
| JP | 7-131537 A | 5/1995 |
| JP | 2000-358093 A | 12/2000 |
| JP | 20011127883 (A) | 5/2001 |
| JP | 2002-92265 A | 3/2002 |
| JP | 2002-92265 A | 3/2002 |
| WO | WO 99/27716 | 6/1999 |

* cited by examiner

*Primary Examiner* — Kwasi Karikari
(74) *Attorney, Agent, or Firm* — Warrington & Smith

(57) ABSTRACT

The invention provides a method and system for handling a session setup procedure initiated by an user equipment for establishing a session of a specific type to a called entity, wherein a session setup request sent to a network entity for establishing the requested session, includes location information and an identifier for identifying the called entity. A database is provided which stores a list of location information and associated identifiers. The network entity accesses this database, wherein, when detecting that the identifier represents a session of the specific type in an area represented by the location information, the session set-up is continued in a manner appropriate for a session of the specific type.

20 Claims, 3 Drawing Sheets

SYSTEM AND METHOD FOR HANDLING SESSIONS OF SPECIFIC TYPE IN COMMUNICATION NETWORKS

CROSS REFERENCE TO RELATED APPLICATIONS

This is a continuation of U.S. patent application Ser. No. 10/513,510, filed Nov. 19, 2004 now U.S. Pat. No. 7,606,556, which is a 371 of International Patent Application No. PCT/IB02/01519, filed May 6, 2002.

FIELD AND BACKGROUND OF THE INVENTION

The present invention relates to a system and method for handling sessions, or requests for sessions, of a specific type such as emergency sessions.

Generally, one or several numbers defining one or more specific services, e.g. emergency service, may be stored in a user equipment, e.g. in SIM/USIM (Subscriber Identity Module/User Service Identity Module) of a mobile terminal (mobile equipment ME). When a SIM/USIM is present, subscriber specific emergency call set-up MMI (Man Machine Interface) is normally provided for establishing emergency session in case of need. An Home Environment operator specifies preferred emergency call MMI(s) (e.g. 911 for US citizens or 110, 118 and 119 for Japanese citizens). This information can be stored in the SIM/USIM. When entering digits for establishing a session, the ME compares the entered digits with the stored information and sets up a specific connection, e.g. an emergency call when detecting that the entered number indicates the desire to establish the specific connection, e.g. is an emergency number. It is usually possible to store more than one emergency number.

However, there may exist cases where the user equipment or a network element, e.g. P-CSCF, involved in handling a requested session is unable to detect that the session is of a specific type requesting specific treatment, such as an emergency session. This may be the case when e.g. the UE has not itself detected that an intended session is e.g. an emergency session (i.e. Emergency call MMIs stored in SIM/USIM do not contain these digits) and the contacted network, e.g. IMS (IP Multimedia Subsystem), does not support emergency services. In particular when a user roams to another network (e.g. roams to a different country), it is possible that an emergency number in the roamed network is same as a service number in the user's home network. E.g. when the dialed number is a service number in one country and an emergency number in another country, the above failure of not detecting a requested specific connection type requiring specific handling may arise.

As explained above, numbers indicating a session or service of a specific type, e.g. an emergency number in the roamed network, may or can possibly not be stored in the USIM/SIM/mobile equipment. This would lead to a case where a user dials an emergency number and the UE is not able to detect, due to overlapping numbers, an emergency call attempt. The UE then sends session setup message towards a network, e.g. an intermediate network such as IMS network, without signaling or indicating the specific session type, e.g. emergency type. In some cases a controlling network element such as P-CSCF or S-CSCF involved in establishing the intended session is also unable to detect an emergency session attempt. When the intermediate network or another involved network such as the user's home network also does not support, or does not detect, the desired specific service type, e.g. emergency services, the session attempt is incorrectly processed.

SUMMARY OF THE INVENTION

According to one aspect, the invention provides a method as defined in the independent method claim.

According to a further aspect, the invention provides a system as defined in the independent system claim.

The invention provides a method and system for processing a session setup procedure initiated by an user equipment for establishing a session of a specific type to a called entity. A session setup request sent to a network entity for establishing the requested session, includes location information and an identifier for identifying the called entity. Using this location information, the network entity accesses a database storing a list of location information and associated identifiers. When detecting that the identifier represents a session of the specific type in an area represented by the location information, the session set-up is continued in a manner appropriate for a session of the specific type.

The database preferably contains an emergency table, i.e. a list of location information and associated emergency session identifiers. The database may be stored in the network entity, allowing a quick and easy check without need of generating messages to other network entities.

The database may also be stored in another network entity accessible to the first-mentioned network entity. Such solution enables the database to be accessed from different network entities, contributing to reduction of total numbers of databases to be provided and to easier maintenance when updating the list.

The session of the specific type preferably is an emergency session, but may also be of another type such as high-priority sessions providing preferred handling of sessions of certain persons or organizations.

In some cases, the user equipment may be roaming, i.e. attached to a visited network, and the network entity accessing the database is part of a home network of the user equipment. In this case the session handling can be controlled by the home network of the user, allowing better control of the user equipment, e.g. for charging purposes.

The network entity may be a Call State Control Function (CSCF), preferably a Proxy Call State Control Function (P-CSCF). The network entity, e.g. the control function, uses the location information to detect whether or not a dialed number is e.g. an emergency number or an emergency URL (Universal Resource Locator) in the visited network.

The location information provides information for detecting the present position of the user equipment. The degree of position information may be sufficiently low so as to detect the country only. The location information may include only a mobile country code (MCC). Alternatively, or even preferably additionally, the location information includes a mobile network code (MNC).

Preferably, when detecting that the identifier is an identifier for initiating a session of the specific type in an area represented by the location information, a message is sent to the user equipment for informing the user equipment that the identifier is an identifier for initiating a session of the specific type.

Otherwise, when detecting that the identifier is no identifier for initiating a session of the specific type in an area represented by the location information, the session may be processed as a session different from a session of the specific type, preferably as a normal session.

This invention thus provides a mechanism and method which solves a problem where the UE has not detected that a requested session is a session of a specific type such as an emergency session, and the contacted network (e.g. an IMS network) providing connection between the visited network and the user's home network does not support emergency services.

The invention solves the above problem by using location info (e.g. CGI, Cell Global Identity) in session setup messages, e.g. INVITE messages, to identify from which country the connection request stems (with MNC the location can also be defined specifically). The P-CSCF may then detect, whether the URL/number represents an emergency one or not.

The UE, or an intermediate network element, therefore inserts a location information to a session set-up request generated by a UE. The location information may be included into every session initiation request, such as an INVITE message of SIP (Session Initiation Protocol).

A network element (e.g. in the visited network or in the home network of the user) uses this location information to detect whether an identifier indicating the called terminal, party or service represents, in the indicated location area, an identifier identifying a session of a specific kind, e.g. an emergency session. The network element includes or has access to a storage storing a table of location information and associated numbers representing sessions of a specific type such as emergency sessions. The table thus provides information on e.g. emergency numbers/emergency URLs in the (e.g. visited) network where the user is currently geographically located or attached.

The identifier may be a dialed number or other type of information provided by the user equipment.

DETAILED DESCRIPTION OF PREFERRED EMBODIMENTS OF THE INVENTION

Figure 1:
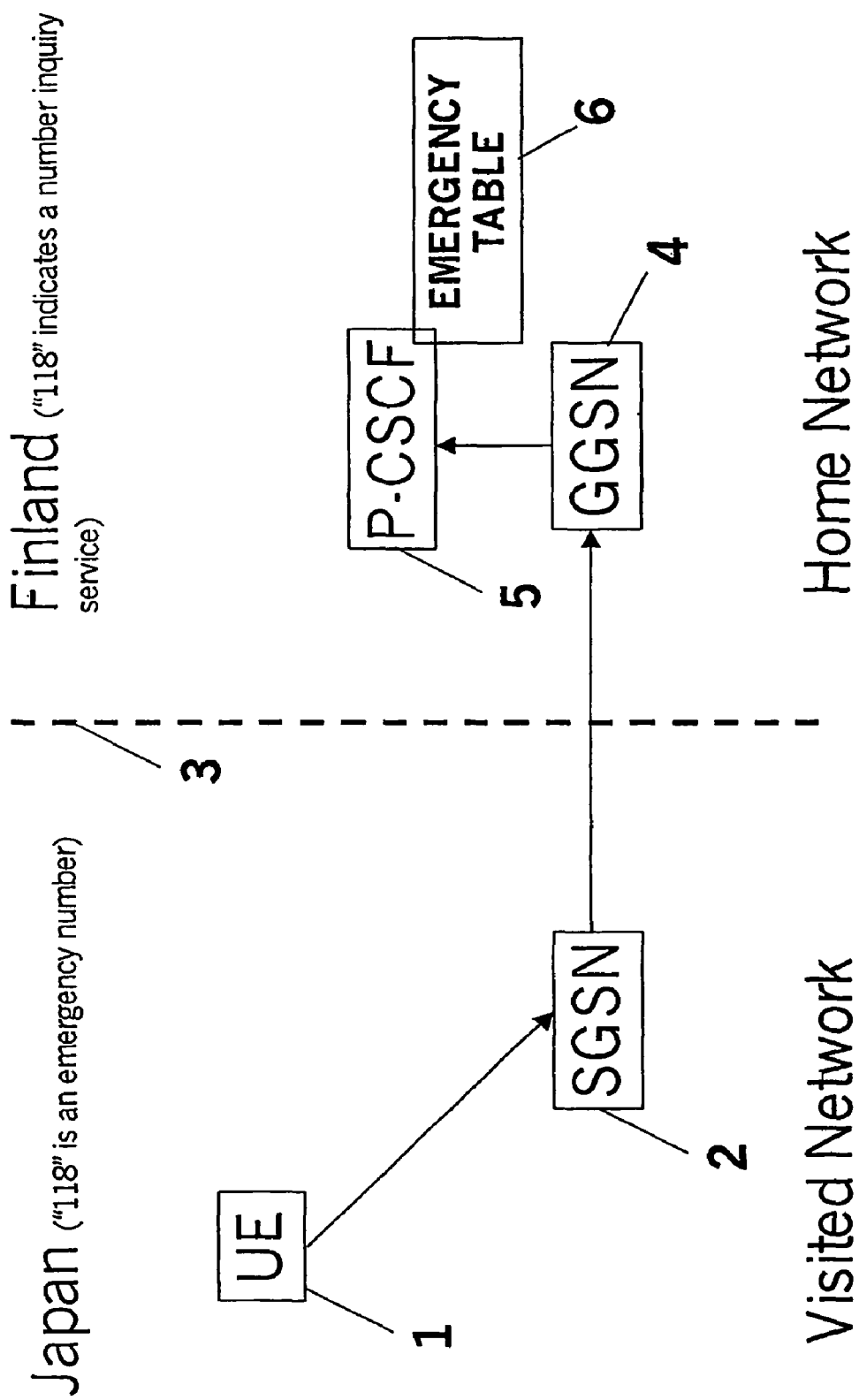
FIG. 1 shows a basic structure of an embodiment of a system in accordance with the invention involving at least two networks.

FIG. 1 shows a basic structure of a method and system in accordance with an embodiment of the invention. The system of FIG. 1 involves a visited network, a home network and may also involve additional or other networks (not shown) such as an IP Multimedia Subsystem.

The implementation of the present invention shown in FIG. 1 incorporates one or more, usually a plurality of UEs (or MSs, Mobile Stations) 1, one or more supporting entities 2 such as SGSN 2 (or MSC/VLR), one or more gateway entities such as GGSN 4, and one or more Proxy Call State Control Functions (P-CSCF) 5. The P-CSCF 5 is located in the same network as the GGSN 4. The GGSN 4 can be either in the visited network or in the home network. In the present case the GGSN 4 is located in the home network of the user (UE 1). Other network entities such as a Home Subscriber Server (HSS), a Serving Call State Control Function (S-CSCF), and other entities and networks may also be provided but are not shown in FIG. 1.

In the example of FIG. 1, a User Equipment (UE) 1 has roamed from its home network located e.g. in Finland to a visited network, e.g. in Japan. The virtual borderline between the home network and the visited network is schematically represented by a broken line 3.

When the UE 1 intends to establish a session, it dials a number or otherwise generates an identifier identifying the called party, terminal equipment, service etc. This identifier is sent as part of a session setup message to a P-CSCF 5, which is the first contact point of IP Multimedia Core Network Subsystem (IMS). The P-CSCF 5 can be either in the home or visited network.

In accordance with this embodiment of the invention the P-CSCF 5, includes a database (list or table) 6 stored in a memory. The database 6 may also be provided (stored) in or as a separate network element accessible to the further network element, e.g. the P-CSCF 5. In the embodiment shown, the database 6 is implemented as an emergency table having a structure e.g. as shown in FIG. 3.

Figure 3:
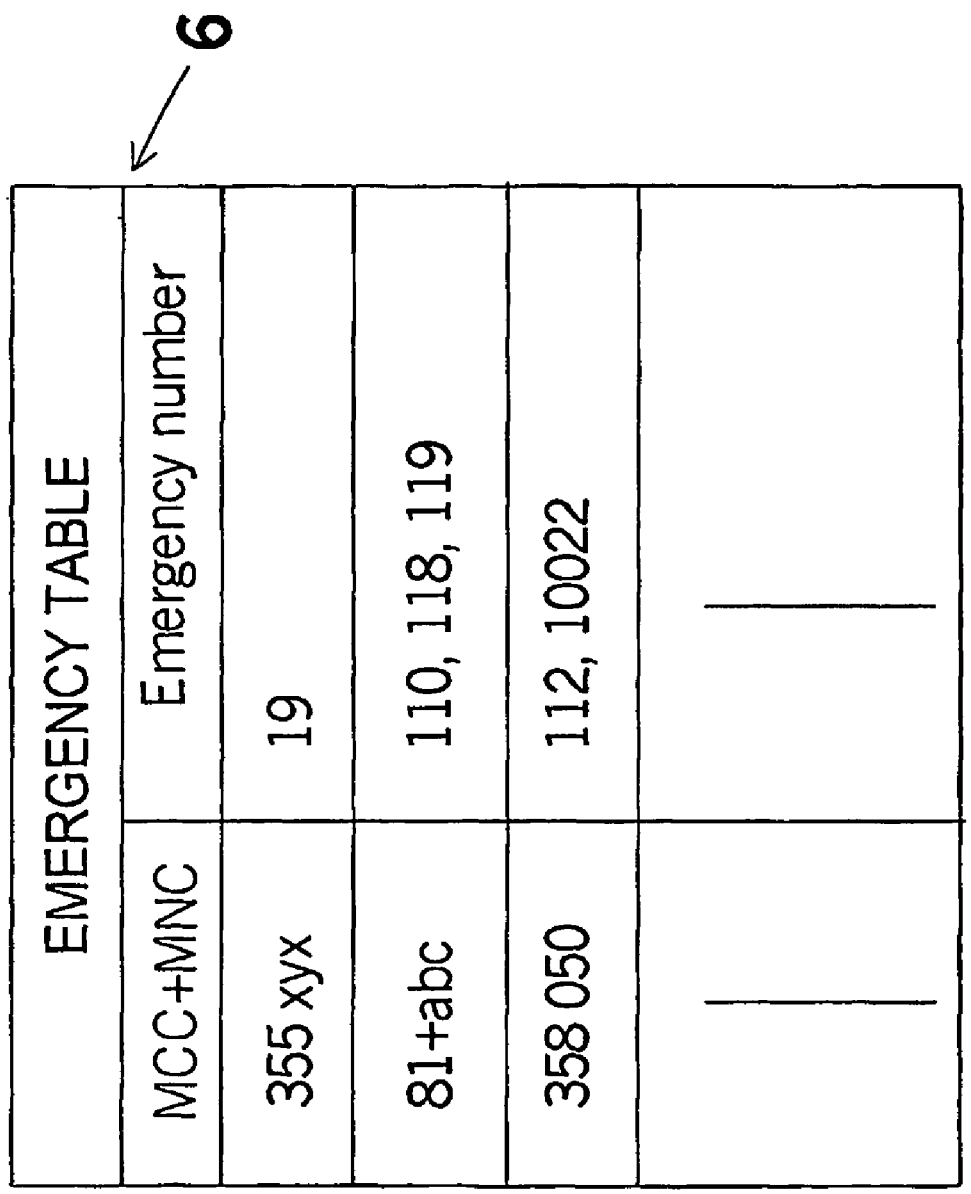
FIG. 3 illustrates an embodiment of a table usable in the present invention.

The emergency table (database) 6 shown in FIG. 3 includes a matrix-like structure with a column "location information", e.g. "MCC+MNC", and a column "emergency numbers" of the location (area, country, network etc.) indicated by the location information of the same line of the table. As an example, the line 355 xyx indicates network xyx of Albany and its emergency number 19; the line 81+abc indicates network abc of Japan and its emergency numbers 110, 118 119; and the line 358 050 indicates network 050 (Radiolinja) of Finland and its emergency numbers 112, 10022. Preferably, the database contains respective entries for all countries, or at least for relevant countries having roaming agreements.

For accessing the database 6, the P-CSCF 5 uses the location information indicated in the received session setup request, and reads the numbers indicated in the same line as the location information. Of course, the database structure may also be different from the shown example. E.g. the columns and lines may be exchanged.

FIG. 1 shows an example of a use case where a problem of overlapping numbers indicating different services (or session types) in different networks or countries occurs. It should be noted that similar overlapping numbers exist elsewhere as well.

As shown in FIG. 1, a calling number "118" represents an emergency call in Japan whereas the same number invokes a number inquiry service in Finland.

Normally, the P-CSCF 5 detects and handles an emergency session establishment request e.g. as per error handling procedures.

For detecting an intended specific session, e.g. emergency session, the P-CSCF 5 inspects the Request URI of all session setup requests, e.g. INVITE requests, for known emergency numbers and emergency URLs from the configurable list or table 6, stored in the database memory, which contains specific service type numbers, e.g. emergency numbers, in association with location information. If the P-CSCF 5 detects, or is informed, that the Request-URI of the session request, e.g. INVITE request, matches one of the numbers in this list, the session request will be appropriately handled for ensuring establishment of a session of the requested specific type.

As an example, the session request may not be forwarded. Instead, the P-CSCF 5 may answer such a session, e.g. INVITE, request with a message, e.g. 380 Alternative Service response. This is one use case. E.g. in Release 5 the session shall not be forwarded to IMS for further session handling. As an alternative, the P-CSCF 5 may modify the Request-URI to uniquely identify the request specific type e.g. by setting value sos@localdomain or adding a special flag to indicate the emergency session. After this the P-CSCF 5 could send the INVITE request further in the IMS. The special indication will assist other nodes to handle the request appropriately.

Consider a specific case where a Finnish user is roaming in Japan and dials an emergency number valid in Japan, 118, for establishing an emergency session. As mentioned above, this number is an emergency number in Japan but is a service number in Finland. In this case, the UE 1, having subscription (e.g. IMS) from Finland, can not detect that the dialed number is an emergency number. Without using the invention, the P-CSCF 5 would also not be able to detect an emergency call attempt because 118 could not be stored, without additional associated location information, as an emergency number/URL in the configurable list (otherwise it would be impossible to call number inquiry in Finland).

In accordance with preferred embodiments of the invention, the UE 1, or an intermediate network element involved in forwarding the session request, inserts a location information to every session establishment request, e.g. INVITE request. The location information has to have enough accuracy for the network to detect requested sessions of a specific type, e.g. emergency number/URL, in the region where the user currently is. E.g. the mobile country code (MCC) and/or mobile network code (MNC) may be provided as location information. When a network element, e.g. P-CSCF 5, receives a session set-up request, e.g. an INVITE message, it processes the request in the following manner:

1.) Use the location information to derive the emergency numbers/URLs within the area, i.e. within the network where the user currently is located.
2.) Compare the dialed number/URL and derived emergency numbers/URLs for the area where the user currently is located.
3a) If the dialed number/URL is an emergency number/URL then follow the standardized procedures for establishing the emergency session. The P-CSCF 5 may e.g. send a specific message, e.g. a 380 error message of SIP, to the UE 1 which may lead a case where the UE 1 uses CS domain for emergency session or the UE 1 re-initiates a session set-up request with an emergency indication to the P-CSCF 5. Alternatively, the P-CSCF may modify the session set-up request e.g. by modifying the Request-URI or adding an emergency session indicator, e.g. the INVITE message, and forward this modified message further within IMS.
3b) If the number/URL is not an emergency number/URL then continue normal session establishment procedures.

The usage of location information in CGI (Cell Global Identity) is preferred, e.g. MCC and MNC, because UEs know both information always from the broadcast information sent from the base stations to which the UE 1 can be attached. Other location information can also be used, e.g. location information provided for alternative accesses.

Figure 2:
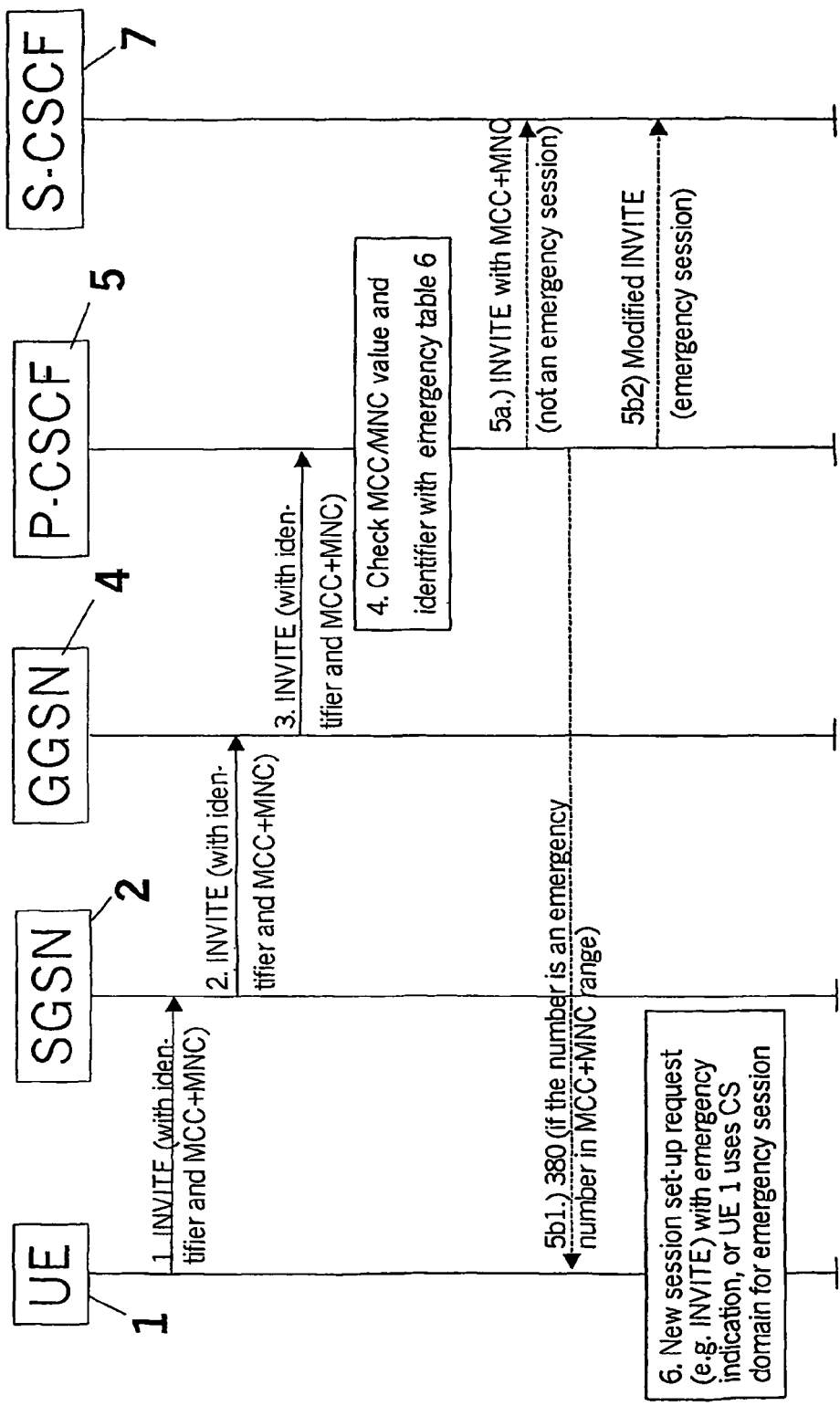
FIG. 2 illustrates an embodiment of a method in accordance with the invention.

In the following, the steps shown in FIG. 2 are described in more detail.

Steps 1-3.) A session request message, e.g. SIP INVITE message, indicating the identifier, e.g. E.164 number, of a called party B, and the location information, e.g. MCC+MNC or CGI (Cell Global Identity), is sent from user equipment 1 to P-CSCF 5 via SGSN 2 and GGSN 4.

Step 4.) The P-CSCF 5 performs a query to the list or table (database) 6 using the indicated identifier and location information. Another feasible implementation is that the P-CSCF 5 sends MCC+(MNC) value to the database 6 and the database 6 sends back all stored emergency numbers associated to the MCC+(MNC) value. Then the P-CSCF 5 compares the dialed number and the received emergency numbers.

Step 5a.) When assuming that the database 6 does not contain an entry corresponding to the MCC+(MNC) value in combination with the dialed number, the P-CSCF 5 concludes that the requested session is a normal session, i.e. is no session of a specific type such as an emergency session. The session is then continued in the normal manner, e.g. by forwarding the INVITE message of step 3.) to a S-CSCF 7. The P-CSCF may remove the MCC+MNC value from the session set-up request.

Step 5b1 or 5b2) When the database 6 does contain an entry for the indicated identifier and location information, the P-CSCF 5 concludes that the requested session is a session of a specific type such as an emergency session.

The P-CSCF 5 either sends a message, e.g. a 380 error message of SIP, to the UE 1 for informing the UE 1 that the request was a request for setting up a session of the specific type, e.g. emergency call (step 5b1), or the P-CSCF modifies the session set-up request and continues a high-priority emergency session within IMS (step 5b2).

Step 6.) In case of step 5b1.), the UE 1 may then request a new session indicating to the P-CSCF 5 that the requested session is an emergency session. Alternatively, the UE may decide to use CS domain for setting up the emergency session.

The invention is also applicable in case of a standalone IMS network, and provides a mechanism for routing back to the visited network when the P-CSCF 5 is in the home network.

While the invention has been described with reference to preferred embodiments, the description is illustrative of the invention and is not to be construed as limiting the invention. The invention may also be implemented in other ways, e.g. by combining, in any arbitrary fashion, one or more features of some embodiments with one or more features of other embodiments. Various modifications and applications may occur to those skilled in the art without departing from the scope of the invention as e.g. defined by the appended claims.

The invention claimed is:

1. A method, comprising:
    initiating a session setup procedure by sending a session setup request from a user equipment to a network entity for establishing a session of a specific type to a called entity in at least one of a packet switched network and an internet protocol multimedia subsystem (IMS) network, wherein the session setup request includes location information for the user equipment and an identifier for identifying the called entity;
    receiving, by the user equipment, a message from the network entity, where the message is configured to inform the user equipment that the identifier is an identifier for initiating an emergency session; and
    after receipt of the message and in response to termination of the session setup procedure in the at least one of a packet switched network and an IMS network, establishing, by the user equipment, a session of the specific type using a circuit switched domain.

2. The method of claim 1, wherein the location information corresponds to a present position of the user equipment.

3. The method of claim 1, wherein the location information comprises a mobile country code or a mobile network code for the user equipment.

4. The method of claim 1, wherein the network entity comprises at least one of a call state control function or a proxy call state control function.

5. The method of claim 1, wherein the message is sent by the network entity in response to detecting that the identifier is an identifier for initiating a session of the specific type in an area represented by the location information.

6. The method of claim 1, wherein the message comprises a session initiation protocol error message.

7. The method of claim 1, wherein the user equipment and the network entity comprise entities of an internet protocol multimedia subsystem/packet switched network.

8. An apparatus, comprising:
a memory; and
a processor configured to cause the apparatus to:
initiate a session setup procedure by sending a session setup request to a network entity for establishing a session of a specific type to a called entity in at least one of a packet switched network and an internet protocol multimedia subsystem (IMS) network, wherein the session setup request includes location information for the apparatus and an identifier for identifying the called entity,
receive a message from the network entity, where the message is configured to inform the apparatus that the identifier is an identifier for initiating an emergency session, and
after receipt of the message and in response to termination of the session setup procedure in the at least one of a packet switched network and an IMS network, establish a session of the specific type using a circuit switched domain.

9. The apparatus of claim 8, wherein the location information corresponds to a present position of the apparatus.

10. The apparatus of claim 8, wherein the location information comprises a mobile country code or a mobile network code for the apparatus.

11. The apparatus of claim 8, wherein the network entity comprises at least one of a call state control function or a proxy call state control function.

12. The apparatus of claim 8, wherein the message is sent by the network entity in response to detecting that the identifier is an identifier for initiating a session of the specific type in an area represented by the location information.

13. The apparatus of claim 8, wherein the message comprises a session initiation protocol error message.

14. The apparatus of claim 8, wherein the apparatus comprises a user equipment.

15. The apparatus of claim 8, wherein the apparatus and the network entity comprise entities of an interne protocol multimedia subsystem/packet switched network.

16. An apparatus, comprising:
means for initiating a session setup procedure by sending a session setup request to a network entity for establishing a session of a specific type to a called entity in at least one of a packet switched network and an internet protocol multimedia subsystem (IMS) network, wherein the session setup request includes location information for the apparatus and an identifier for identifying the called entity;
means for receiving a message from the network entity, where the message is configured to inform the apparatus that the identifier is an identifier for initiating an emergency session; and
means for establishing, after receipt of the message and in response to termination of the session setup procedure in the at least one of a packet switched network and an IMS network, a session of the specific type using a circuit switched domain.

17. A method, comprising:
initiating a session setup procedure by sending a session setup request from a user equipment to a network entity for establishing a session of a specific type to a called entity in at least one of a packet switched network and an internet protocol multimedia subsystem (IMS) network, wherein the session setup request includes location information for the user equipment and an identifier for identifying the called entity;
receiving, by the user equipment, a message from the network entity, where the message is configured to inform the user equipment that the identifier is an identifier for initiating an emergency session; and
after receipt of the message and in response to not forwarding the session setup request for further handling in IMS network, establishing, by the user equipment, a session of the specific type using a circuit switched domain.

18. The method of claim 17, wherein the message is sent by the network entity in response to detecting that the identifier is an identifier for initiating a session of the specific type in an area represented by the location information.

19. An apparatus, comprising:
means for initiating a session setup procedure by sending a session setup request to a network entity for establishing a session of a specific type to a called entity in at least one of a packet switched network and an internet protocol multimedia subsystem (IMS) network, wherein the session setup request includes location information for the apparatus and an identifier for identifying the called entity;
means for receiving a message from the network entity, where the message is configured to inform the apparatus that the identifier is an identifier for initiating an emergency session; and
means for establishing, after receipt of the message and in response to not forwarding the session setup request for further handling in IMS network and an IMS session initiation protocol error message.

20. An apparatus, comprising:
a memory; and
a processor configured to cause the apparatus to:
initiate a session setup procedure by sending a session setup request to a network entity for establishing a session of a specific type to a called entity in at least one of a packet switched network and an interne protocol multimedia subsystem (IMS) network, wherein the session setup request includes location information for the apparatus and an identifier for identifying the called entity,
receive a message from the network entity, where the message is configured to inform the apparatus that the identifier is an identifier for initiating an emergency session, and
after receipt of the message and in response to not forwarding the session setup request for further handling in IMS network, establish a session of the specific type using a circuit switched domain.

* * * * *

UNITED STATES PATENT AND TRADEMARK OFFICE
CERTIFICATE OF CORRECTION

PATENT NO. : 8,103,243 B2  
APPLICATION NO. : 12/584798  
DATED : January 24, 2012  
INVENTOR(S) : Poikselkä et al.

It is certified that error appears in the above-identified patent and that said Letters Patent is hereby corrected as shown below:

Claim 15, col. 7, line 39 delete "interne" and insert --internet--.

Claim 20, col. 8, line 45 delete "interne" and insert --internet--.

Signed and Sealed this
Fifteenth Day of May, 2012

David J. Kappos
*Director of the United States Patent and Trademark Office*